US012765508B2

(12) United States Patent
Wees

(10) Patent No.: US 12,765,508 B2
(45) Date of Patent: Oct. 20, 2026

(54) COMPRESSIBLE ANIMAL LITTER SIFTER

(71) Applicant: Clean Litter Club LLC, Zionsville, IN (US)

(72) Inventor: Amy Leah Wees, San Antonio, TX (US)

(73) Assignee: Clean Litter Club LLC, Zionsville, IN (US)

( * ) Notice: Subject to any disclaimer, the term of this patent is extended or adjusted under 35 U.S.C. 154(b) by 140 days.

(21) Appl. No.: 18/952,369

(22) Filed: Nov. 19, 2024

(65) Prior Publication Data

US 2025/0072386 A1 Mar. 6, 2025

Related U.S. Application Data

(63) Continuation of application No. 17/117,316, filed on Dec. 10, 2020, now Pat. No. 12,144,314, which is a continuation of application No. 15/887,128, filed on Feb. 2, 2018, now Pat. No. 11,096,371.

(60) Provisional application No. 62/457,622, filed on Feb. 10, 2017.

(51) Int. Cl.
*A01K 1/01* (2006.01)

(52) U.S. Cl.
CPC .................................. *A01K 1/0114* (2013.01)

(58) Field of Classification Search
CPC .. A01K 1/0114; A01K 1/0125; A01K 1/0107; B65D 37/00; B65F 1/06; B65F 1/1415; B65F 1/08
USPC ................. 119/166, 167, 168, 165, 170, 479
See application file for complete search history.

(56) References Cited

U.S. PATENT DOCUMENTS

| | | | | | |
|---|---|---|---|---|---|
| 3,014,516 | A | * | 12/1961 | Mueller ................. | B65D 37/00 138/131 |
| 3,809,013 | A | * | 5/1974 | Rigney ................ | A01K 1/0107 119/167 |
| 4,308,825 | A | * | 1/1982 | Stepanian ............ | A01K 1/0114 119/167 |
| 4,312,295 | A | * | 1/1982 | Harrington .......... | A01K 1/0114 119/167 |
| 4,615,300 | A | * | 10/1986 | McDonough ........ | A01K 1/0114 119/167 |
| 4,624,380 | A | * | 11/1986 | Wernette .............. | A01K 1/0125 229/101 |
| 4,723,510 | A | * | 2/1988 | Skillestad ............ | A01K 1/0125 119/167 |

(Continued)

OTHER PUBLICATIONS

International Searching Authority, International Search Report, PCT/US18/48212, Dated Oct. 29, 2018.

(Continued)

*Primary Examiner* — Yvonne R Abbott-Lewis
(74) *Attorney, Agent, or Firm* — Reichel Stohry Dean LLP; Mark C. Reichel; Natalie J. Dean

(57) ABSTRACT

The animal litter sifter comprising, a sifter receptacle having an internal chamber with an opening, and having a top edge, a sifter frame sized to rest on the top edge of the sifter receptacle, wherein the sifter receptacle having an opening substantially aligned with the sifter receptacle opening, and a sifter basket having a plurality of side walls converging towards a bottom extending into the sifter receptacle and secured to the sifter frame, wherein at least one sidewall having an impermeable and the remaining sidewalls having a plurality of passages therethrough.

20 Claims, 6 Drawing Sheets

(56) References Cited

U.S. PATENT DOCUMENTS

| | | | | | |
|---|---|---|---|---|---|
| 4,784,082 | A | * | 11/1988 | Wolfe | A01K 1/0114 119/167 |
| 4,802,442 | A | * | 2/1989 | Wilson | A01K 1/0114 119/166 |
| 4,817,560 | A | * | 4/1989 | Prince | A01K 1/0114 119/166 |
| 4,846,103 | A | * | 7/1989 | Brown | A01K 1/0125 119/168 |
| 4,848,274 | A | * | 7/1989 | Yananton | A01K 1/0107 119/169 |
| 4,870,924 | A | * | 10/1989 | Wolfe | A01K 1/0114 119/167 |
| 4,989,749 | A | * | 2/1991 | Choi | B65F 1/06 D34/1 |
| 5,031,578 | A | * | 7/1991 | Hammons | A01K 1/0114 119/167 |
| 5,121,712 | A | * | 6/1992 | Schulein, Jr | A01K 1/0114 119/167 |
| 5,158,042 | A | * | 10/1992 | Hammerslag | A01K 1/0114 119/167 |
| 5,207,772 | A | * | 5/1993 | Lauretta | A01K 1/0114 119/167 |
| 5,325,815 | A | * | 7/1994 | Gumpesberger | A01K 1/0114 119/166 |
| 5,337,700 | A | * | 8/1994 | Toft | A01K 1/0125 229/117.02 |
| 5,372,095 | A | * | 12/1994 | Dowling | A01K 1/0114 119/166 |
| 5,419,282 | A | * | 5/1995 | Dennis | A01K 1/0114 119/168 |
| D363,369 | S | * | 10/1995 | Hoth | D30/161 |
| 5,490,623 | A | * | 2/1996 | McConnell | B60R 7/043 224/539 |
| 5,507,248 | A | * | 4/1996 | Gabbert | A01K 1/0114 119/166 |
| 5,551,376 | A | * | 9/1996 | Lundeen | A01K 1/0114 119/167 |
| 5,564,366 | A | * | 10/1996 | Hancock | A01K 1/0114 119/167 |
| 5,598,811 | A | * | 2/1997 | Merchant | A01K 1/0114 119/166 |
| 5,690,051 | A | | 11/1997 | Fisher | |
| 5,752,466 | A | * | 5/1998 | Lundeen | A01K 1/0114 119/167 |
| 5,893,336 | A | * | 4/1999 | Vice | A01K 1/0114 119/166 |
| 5,983,832 | A | * | 11/1999 | Seo | A01K 1/0114 119/167 |
| 6,095,088 | A | | 8/2000 | Savicki | |
| 6,401,660 | B1 | * | 6/2002 | Wolff | A01K 1/0114 119/168 |
| 6,431,393 | B1 | * | 8/2002 | Stewart | B65D 37/00 220/826 |
| 6,520,365 | B2 | * | 2/2003 | Schneider | D06F 95/002 220/666 |
| 6,561,130 | B1 | * | 5/2003 | Sage, Jr. | A01K 1/0107 119/479 |
| 6,595,159 | B1 | * | 7/2003 | Montalbano | A01K 1/0114 119/167 |
| 6,616,004 | B1 | * | 9/2003 | Erickson | B65F 1/02 220/666 |
| 6,668,755 | B1 | * | 12/2003 | Koster | A01K 1/0114 119/167 |
| 6,745,719 | B1 | * | 6/2004 | Howerton | A01K 1/0114 119/166 |
| D899,015 | S | * | 10/2020 | Rossi | D30/161 |
| 11,096,371 | B2 | | 8/2021 | Wees | |
| 2004/0244716 | A1 | | 12/2004 | Simpson | |
| 2007/0113793 | A1 | | 5/2007 | Kurahashi | |
| 2007/0289545 | A1 | * | 12/2007 | Hildenbrand | A01K 1/0125 119/265 |
| 2008/0083376 | A1 | | 4/2008 | Hurwitz | |
| 2008/0314328 | A1 | | 12/2008 | Johnson | |
| 2009/0194033 | A1 | | 8/2009 | Modlin | |
| 2011/0011347 | A1 | | 1/2011 | Ohlman | |
| 2012/0006275 | A1 | | 1/2012 | Brenner | |
| 2012/0210943 | A1 | | 8/2012 | Omps | |
| 2012/0234252 | A1 | | 9/2012 | Donta | |
| 2013/0112149 | A1 | | 5/2013 | Robbins | |
| 2013/0133585 | A1 | | 5/2013 | Hecht | |
| 2014/0283753 | A1 | * | 9/2014 | Dawn | A01K 1/0114 119/166 |
| 2015/0114303 | A1 | | 4/2015 | Shamir | |
| 2015/0164040 | A1 | | 6/2015 | Anderson | |
| 2017/0292511 | A1 | * | 10/2017 | Frayne | F04B 45/06 |
| 2018/0020635 | A1 | | 1/2018 | Huang | |
| 2018/0042199 | A1 | | 2/2018 | Smith | |
| 2018/0192610 | A1 | | 7/2018 | Petty | |
| 2019/0085503 | A1 | | 3/2019 | Tsui | |
| 2019/0357494 | A1 | | 11/2019 | Garrett | |
| 2022/0110485 | A1 | | 4/2022 | Dos Santos | |

OTHER PUBLICATIONS

International Searching Authority, Written Opinion of the International Searching Authority, PCT/US18/48212, Dated Oct. 29, 2018.

* cited by examiner

COMPRESSIBLE ANIMAL LITTER SIFTER

PRIORITY AND CROSS-REFERENCE TO RELATED APPLICATIONS

The present application is related to, claims the priority benefit of, and is a U.S. continuation patent application of, U.S. patent application Ser. No. 17/117,316, filed on Dec. 12, 2020 and issues as U.S. Pat. No. 12,144,314 on Nov. 19, 2024, which is related to, claims the priority benefit of, and is a U.S. continuation-in-part patent application of, U.S. patent application Ser. No. 15/887,120, filed on Feb. 2, 2018 and issued as U.S. Pat. No. 11,096,371 on Aug. 24, 2021, which is related to, and claims the priority benefit of, U.S. provisional patent application Ser. No. 62/457,622, filed on Feb. 10, 2017. The contents of each of the aforementioned patent applications are incorporated herein directly and by reference in their entirety.

BACKGROUND

The present invention disclosed herein relates to an animal litter cleaning system and method to remove animal waste from the animal litter using a sifting or sieving apparatus in order to reuse the litter. The present invention provides a means to clean animal litter using little or no sieving or sifting motion exertion by the user. The present invention is also a system that allows ease of removal and disposal of the sifted waste that has been removed from the litter. In addition, the present invention separates the sifting apparatus from an animal litter box in order to allow ease of cleaning the animal litter box.

Devices and systems have been previously devised to clean animal waste from animal litter. Cleaning animal waste from litter boxes in a cost effective manner requires removing or sifting the waste by hand or using automated sifting devices that employ a sifting or sieving apparatus. The waste can be sieved or sifted directly to remove it from the litter. The animal waste may also be separated and removed as material that consists of the waste combined with litter that has been designed to stick or adhere to the waste in clumps. Once the waste has been removed, the cleaned litter may then be re-used.

Removing and disposing the sifted waste from the sifting apparatus can be difficult due to clumps and waste that stick to the sifting apparatus or which are difficult to pour out from the sifting apparatus into a waste disposal container. Manually scooping the litter using a sifting scoop requires effort to dispose of the waste and allows for significant litter spillage. Self-cleaning or robotic litter boxes are expensive and are prone to waste sticking to the cleaning apparatus.

In addition, the litter and animal waste of litter boxes are relatively heavy materials. Sifting the litter requires shaking or introducing sieving motion to the sifter and its heavy waste in order to allow separation of clean litter from waste or waste clumps. Introducing the sieving motion, manually, may be difficult for some individuals.

Therefore, it is desired that a litter cleaning invention utilizes a removable litter sifter basket having a grid, mesh, holes or other appropriately sized orifices and a receptacle bin, which together form a separate device from the litter box. The separation of the present invention, from a litter box which that is to be cleaned, allows easy cleaning of the litter box. The present invention also allows the use of scooped or curved walls, optionally having a lip, integrated into the litter sifter basket, which lip allow ease of disposal of the waste cleaned from the litter. In addition, the present invention may optionally provide for a mechanical or motorized shaking element that imparts automated sifting motion so that the user is not required to lift and shake the litter to be cleaned.

BRIEF SUMMARY OF THE INVENTION

The present invention as disclosed herein provides a means to clean litter using sieving or sifting device to remove the waste with little physical exertion or strength of the user. The present invention allows ease of removal and disposal of the sifted waste that has been removed from the litter. In addition, the present invention separates the sifting apparatus from a litter box in order to allow ease of cleaning the litter box.

The intended purpose of the invention is to sift and temporarily store litter for cleaning purposes, separating waste from clean litter through use of a sifting apparatus and holding bin.

In one embodiment an litter sifter comprising, a sifter receptacle having an internal chamber with an opening, and having a top edge, a sifter frame sized to rest on the top edge of the sifter receptacle, wherein the sifter receptacle having an opening substantially aligned with the sifter receptacle opening, and a sifter basket having a plurality of side walls converging towards a bottom extending into the sifter receptacle and secured to the sifter frame, wherein at least one sidewall having an impermeable and the remaining sidewalls having a plurality of passages therethrough.

In another embodiment an litter sifter comprising, a sifter receptacle having an internal chamber with an opening, and having a top edge, a sifter frame sized to rest on the top edge of the sifter receptacle, wherein the sifter receptacle having an opening substantially aligned with the sifter receptacle opening, and a sifter basket having a front sidewall, a second sidewall, a third sidewall, and a forth sidewall converging towards a bottom wall, wherein the sidewalls extend into the sifter receptacle and are secured to the sifter frame and the first sidewall and the second sidewall are impermeable and opposing one another and the third sidewall, the fourth sidewall, and the bottom wall having a plurality of passages therethrough.

DETAILED DESCRIPTION

Figure 1:
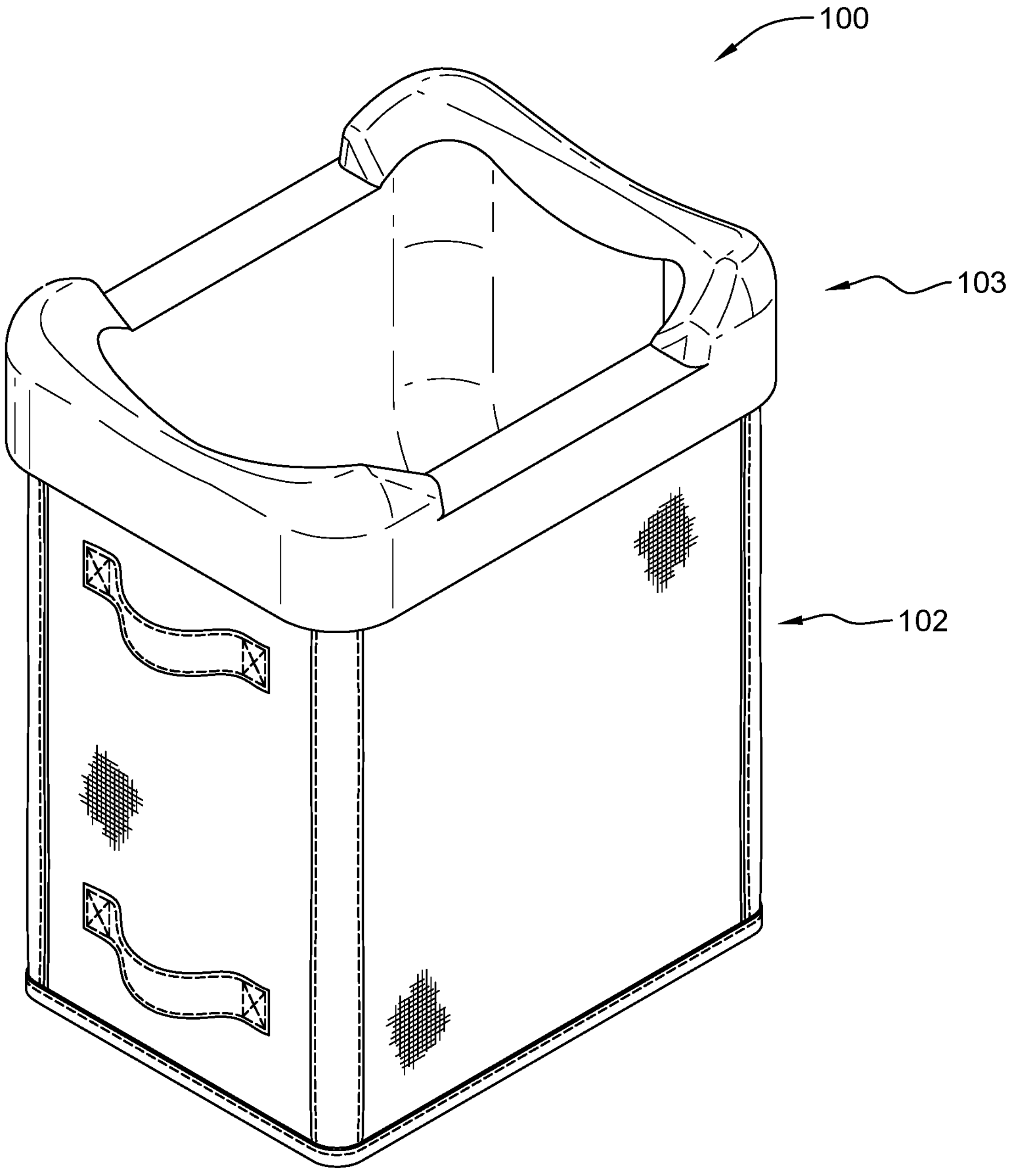
FIG. 1 illustrates a perspective view of an embodiment of a litter sifter basket, in accordance with one embodiment of the present invention.

The present invention provides a litter box that allows for easy and fast separation of unused litter and the used litter.

With the simple two-part design the invention is easy to use, easy to dismantle, and given that the container is collapsible, the device can be easily stored in a small space when not in use.

The following descriptions are considered to be illustrative of the principles of the present invention and are not intended to be limiting. One of skill in the art will recognize and understand that there are suitable modifications and equivalents that may be used which fall within the scope of the invention described herein. The use of singular forms "a," "an," and "the" include plural references unless the context clearly requires otherwise. The embodiments are not limited to those illustrated in the drawings. It should also be understood that the drawings are not necessarily to scale. In certain instances, details may have been omitted that are not necessary for an understanding of the embodiments disclosed herein, for example, conventional fabrication and assembly.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

FIG. 1 illustrates a perspective view of an embodiment of a litter sifter basket 100 of the present invention. The litter sifter basket 100 is comprised of a container 102 and a sifter 103. The container 102 is designed to have the sifter 103 sit on top of the open end of the container 102 and allow any material poured into the sifter 103 to either fall into the container 102 (if the material is small enough) or remain in the sifter 103.

Figure 4:
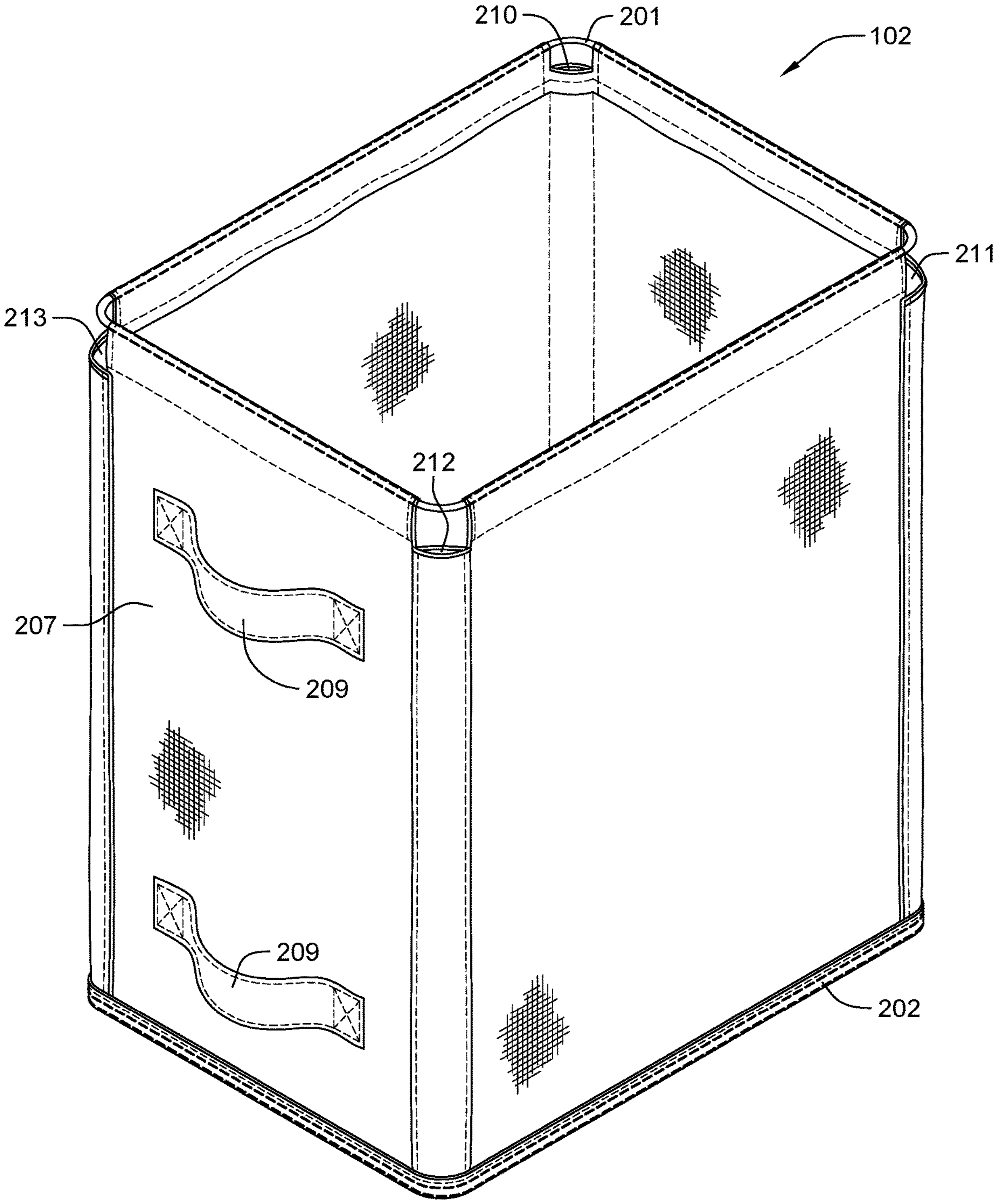
FIG. 4 illustrates an isometric view of the litter sifter container, in accordance with one embodiment of the present invention.
Figure 6:
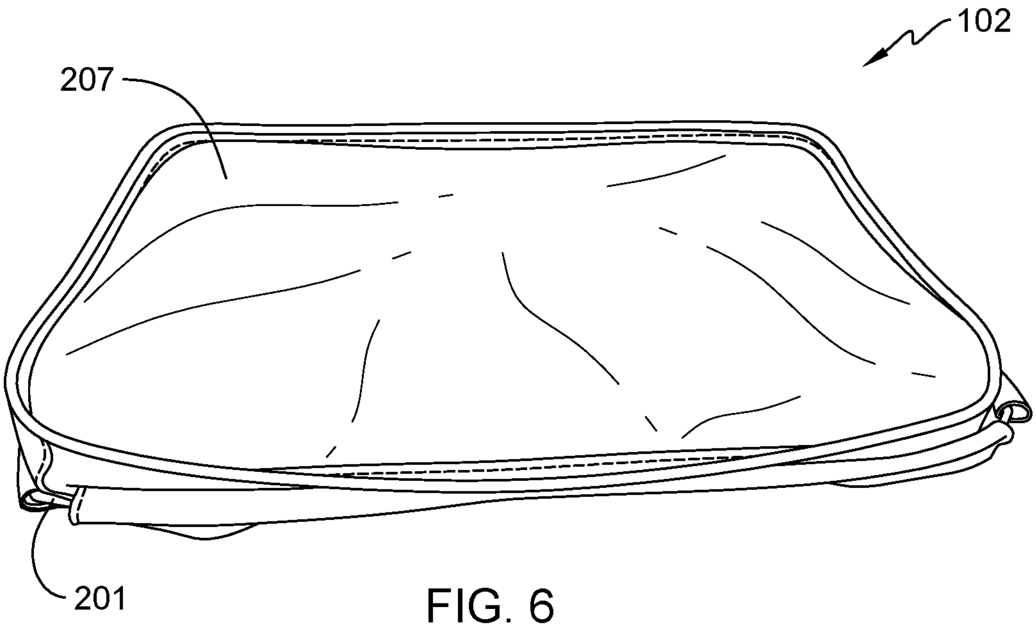
FIG. 6 illustrates an isometric view of the litter sifter container in a compressed form, in accordance with one embodiment of the present invention.

The container 102 is designed to provide a basin to catch any material which falls through the sifter 103 and also to support the sifter 103 when placed on the container 102. The container 102 in the depicted embodiment, is a substantially cuboid shape. In additional embodiments, the container 102 may have various shapes which are designed to mate with a sifter 103. The container 102 is comprised of a cloth cover 207 with an internal frame structure (shown in FIG. 4) The cloth cover 207 is held in place by a series of frame members concealed within the cloth cover 207. The frame is comprised of a lower frame member 201, a upper frame member 202, and four vertical members 203, 204, 205, and 206. The vertical members are rotatably attached to the lower frame member 201 and are detachably engaged with the upper frame member 202 as shown. Each vertical frame member has an attachment clip 208 which is then secured to the upper frame member 202, thus forming the container 102 by holding the cloth cover 207 in place. The attachment clips 208 allows for the assembly, and disassembly of the sifter basket 100. Thus, permitting the container 102 to be folded down into a "storage" position. The attachment clips 208 may be a separate component which is attached to the vertical members, or may be designed a unitary piece. As shown in FIG. 6, the container 102 is able to be collapsible when the vertical frame members 203, 204, 205, and 206 are disconnected from the upper and/or lower frame members 201 and 202. The cloth cover 207 folds or collapses down into a smaller size for storage. In the depicted embodiment, the upper and lower frame members 201 and 202 are still integrated into the cloth cover 207 and the vertical members are removed.

Figure 2:
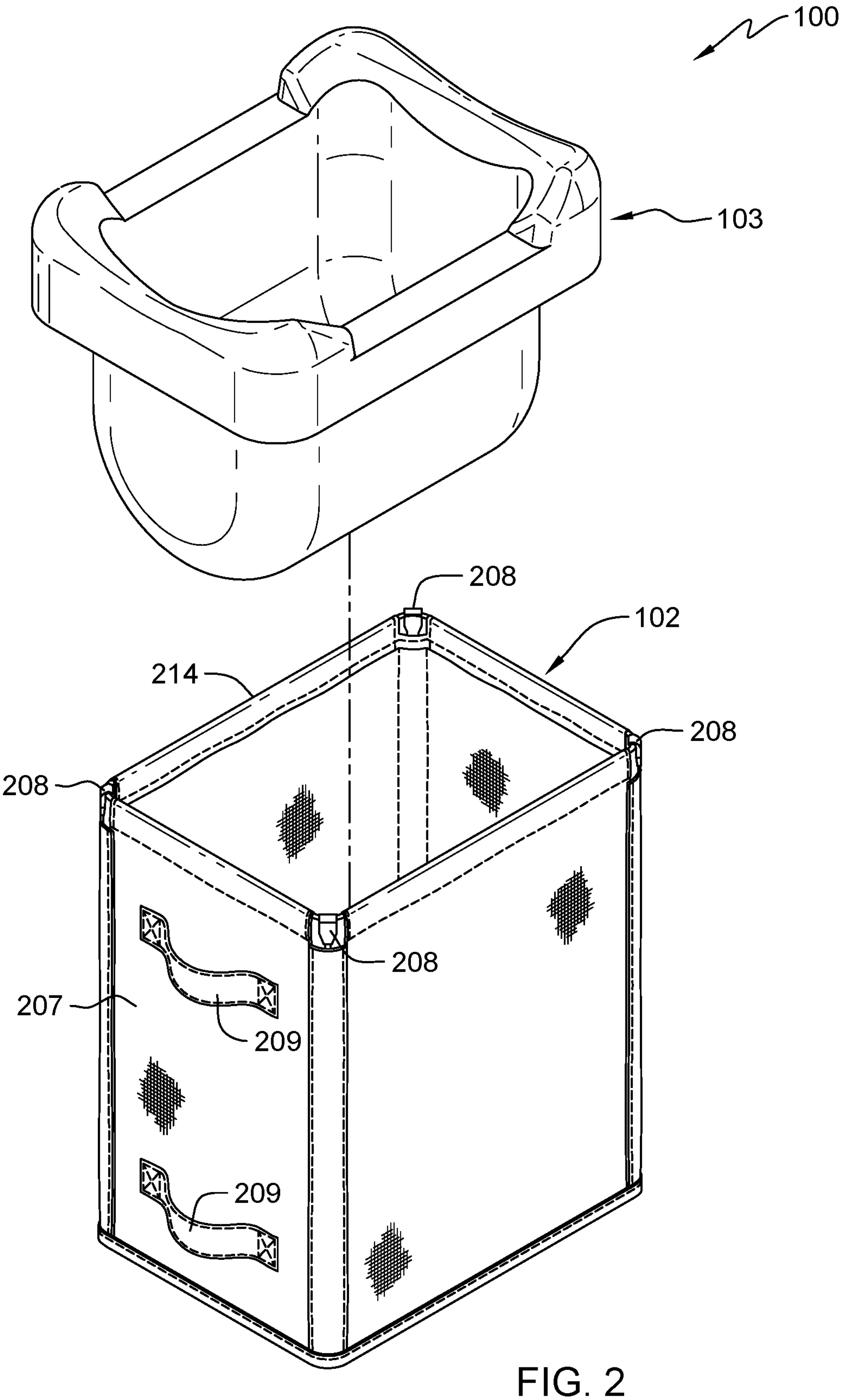
FIG. 2 illustrates a disassembled view of an embodiment of the litter sifter basket, in accordance with one embodiment of the present invention.
Figure 3:
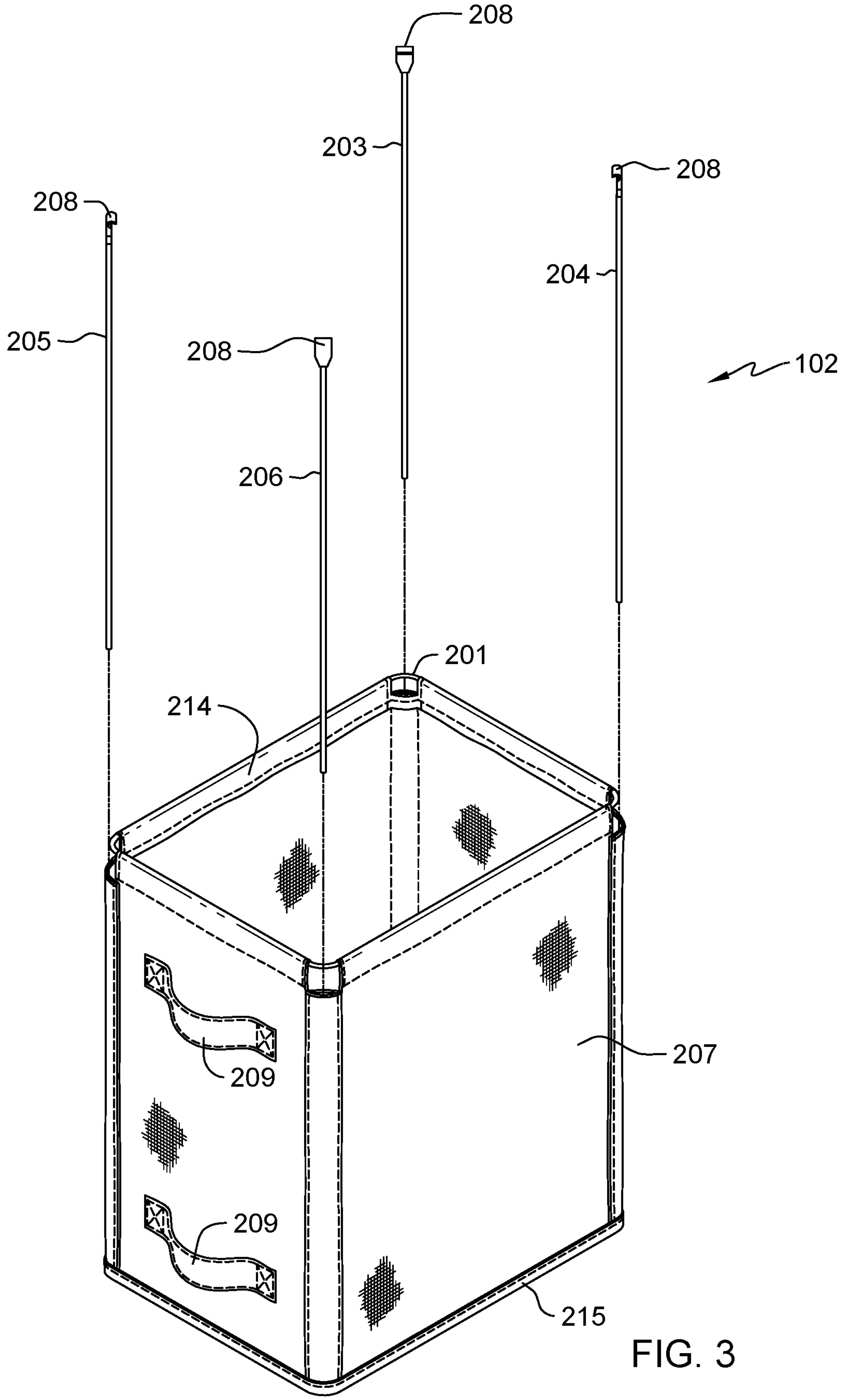
FIG. 3 illustrates a disassembled view of an embodiment of the litter sifter basket, in accordance with one embodiment of the present invention.

The sifter basket 100 in FIG. 1, is shown in the "in use position" where the container 102 constructed. FIGS. 2 and 3 show various stages of disassembly of the basket 100. First with the sifter 103 removed from the container 102 but with the vertical members still connected to the upper member. Then the vertical members are shown removed, wherein the cloth cover 207 can be folded or compressed down. In some embodiments, the vertical members remain attached to the lower frame member and are disconnected at the attachment clip 208, the cloth cover 207 is able to slide down the vertical members, and the vertical members lay diagonally across the cloth cover 207 towards the opposing corner forming an "x" with the vertical members.

In some embodiments the vertical members are telescopic and are able to collapse down to a shorter length. In some embodiments, the cloth cover 207 is designed to allow for the removal of the upper and lower frame members. This is achieved through zippers or re-closeable or resealable locking devices or fasteners integrated into the cloth cover 207 relative to the frame members. In some embodiments, the frame members 201 and 202 are jointed or hinged to further compress the container 102 down when not in use.

The cloth cover 207 may also have handles 209 secured to the outside for holding, pouring, and carrying purposes. The cloth cover 207 may have a waterproof coating or multiple layers to provide a substantial waterproof interior compartment. In the depicted embodiment, the cloth cover 207 is stitched to have four compartments in the corners where the vertical members are inserted into and the upper and lower frame members are contained with the cloth cover 207. For the vertical members, the compartments assist in keeping the vertical members in the correct orientation when in use.

The container 102 should be of a height which allows easy sifting and to capture an anticipated quantity of material. For example, the container 102 can be twice the height of the sifter 103. For example, the container 102 may be approximately (twelve) 12 inches or more in height to accommodate easy sifting. The height of the container 102 should accommodate the space needed to sift and sift litter for at least one litter box full of standard clumping or non-clumping, for example, clay, silica, or natural cat litters. The container 102, is a vessel which defines a void therein. The void may be of any shape that allows litter to be sifted and separated from the waste. In the depicted embodiment, the container 102, has a rectangular cuboid shape, four vertical sides 202, a bottom surface 204 which is comprised of a substantially flat surface. The container 102, further has a flattened receptacle top edge 217, formed therein at the top of the vertical sides 202. The container 102 may have various shapes, number of vertical sides 202 and dimensions. The container 102 is likely made of a fabric or compressible material that is waterproof. The frame of the container 102 is made from a durable material such as metal or plastic to provide the structural rigidity.

In the depicted embodiment sifter 103 sides atop the top edge 217 of the container 102. The container 102 and the sifter 103 contact one another in a continuous and close-fitting junction to form a seal between the two components. In additional embodiments, there may be a fastening means or lock to secure the sifter 103 and the container 102 together. This may include, but not limited to fasteners, latches, pressure fitments, magnets, or the like. This assists in keeping all materials which are poured into the sifter 103 and which fall into the container 102 do not fall outside or on the ground around the basket 100.

The close-fitting junction may be achieved by manufacturing the container 102 and the sifter 103 that allows the continuous and close-fitting junction, to be a collinear or substantially collinear interface. In an example embodiment, container 102 and the sifter 103 are fitted to hinder a particle the size of a piece of litter passing through the junction. The close-fitting junction and the distance from the bottom of the sifter 103 and the bottom of the container 102 prevents clean litter from exiting the close-fitting junction.

Figure 5:
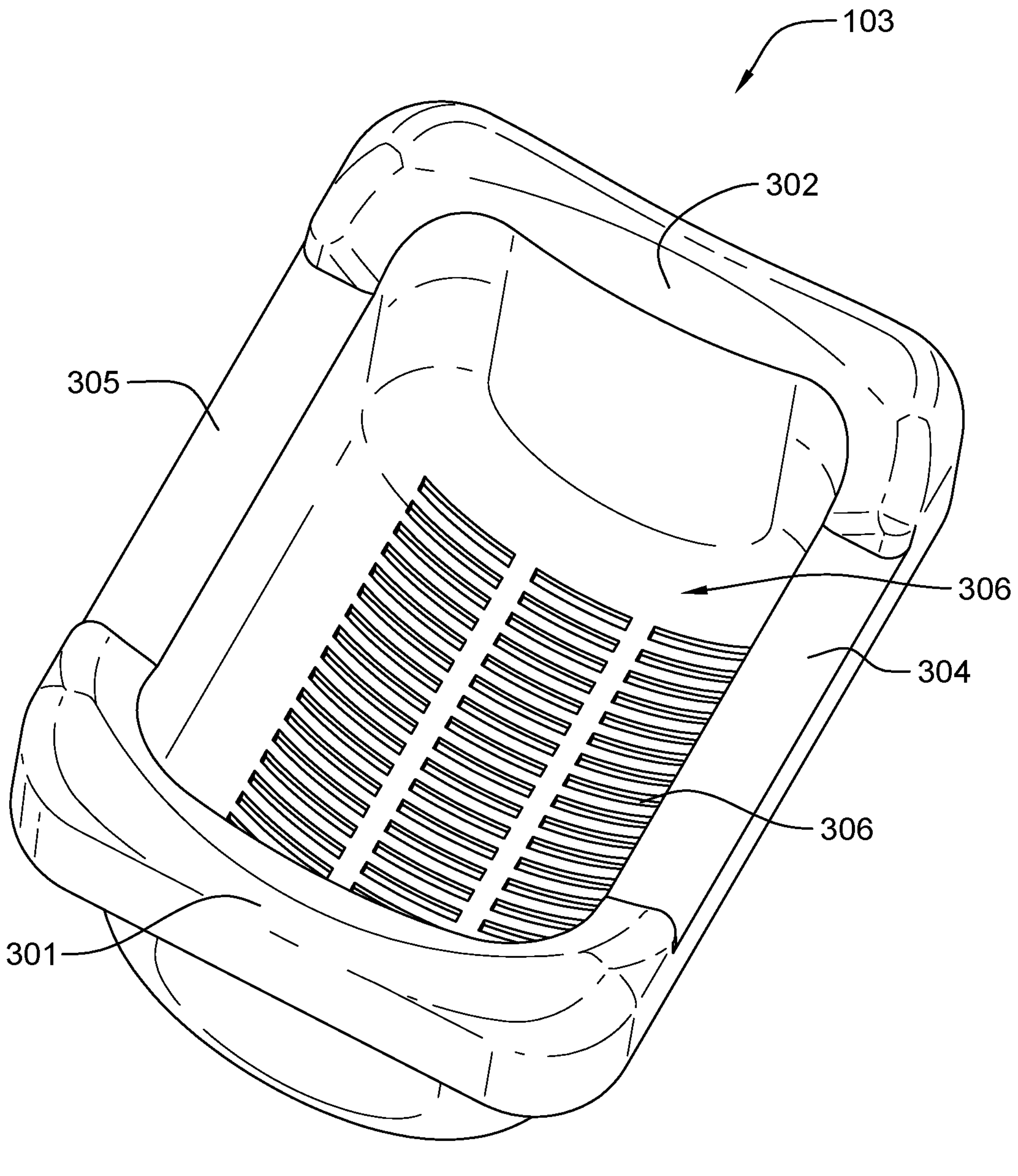
FIG. 5 illustrates an isometric view of the sifter basket, in accordance with one embodiment of the present invention.

The sifter 103 is designed to fit around the container 102 to allow litter to be poured into the sifter 103, and the smaller particles will fall through the sifter 103, and the larger particles or clumps will remain in the sifter 103 for easy disposal. In the depicted embodiment, the sifter 103 has an elevated front end 301 and rear end 302 with a flat section 303 and 304 along the sides. The ends 301 and 302 have a contour designed to act as a funnel to direct the litter box down and into the basin 305 of the sifter 103 and also for pouring the larger particles into a separate waste bin. The basin 305 is designed to funnel all the liter down to a center or bottom of the basin 305. As shown in FIG. 5, the bottom of the basin 305 has slots, openings, apertures, or the like (306) to allow the finer particles of the litter to pass through, while the larger clumps remain in the sifter 103. In some embodiments, the sifter 103 is a single unitary piece with the slots part of the sifter 103. In other embodiments, the slots/bottom portion of the sifter 103 is a removable section to be replaced to allow for a variety of screens, openings, or apertures to be attached to the basin 305 based on the intended use and size of particles which are desired to pass through the sifter 103. When the sifter is placed over the container 102, the basin 305 is substantially contained within the container 102 while the sections 303 and 304 rest on the top edge 217 of the container 102. The ends 301 and 302 are elevated over the top of the container 102 and provide an edge to grab when removing the sifter 103 from the container 102.

In embodiments where the bottom portion of the sifter 103 is removable, a screen with defined openings through which litter (or other matter) may pass and which is attached to the basin 305. In additional embodiments, the screen may form various shapes and curvatures. The screen may be formed of any rigid or semi-rigid material, for example, metal or plastic mesh, metal, wood, or plastic surface in which are formed a plurality of openings.

In one embodiment, the sifter 103 has openings of a width of about 0.15 to about 1.0 cm. In additional embodiments, the opening width may be altered depending on the type of litter material designed to sift, for example, small pine bedding, may require larger openings. The widths of the openings in the sifter 103 may be selected and chosen for use for specific types of litter. These characteristics may be part of the unitary design as well.

The basin 305 is designed to give a solid surface to pour waste of the sifter 103 into another receptacle such as a garbage can. In the depicted embodiment, the basin 305 with a concaved design. The basin 305 may have various curvatures and designed to allow for centralizing the waste of the sifter 103 to allow for an easier and cleaning pour. In some embodiments the basin 305 may have ridges to assist in slowing the flow of the waste to further control the pouring of the waste.

In some embodiments, the sifter 103 may have handles to hold the sifter 103 when transporting or pouring the contents into a receptacle. In some embodiments, the inside surface of the basin 305 has an anti-stick coating or the like to further assist the movement of the waste into a receptacle. In some embodiments, the basin 305 additionally has the anti-stick coating.

The basin 305 is designed to be similar in design to the container 102 so that the basin 305 is directed into the container 102 so that there is little to no changes that the sifter 103 will not be properly situated in the container 102. The basin extends a predetermined distance down into the container 102 to reduce the poured items to exit the sifter 103.

In some embodiments, the sifter 103 has a pouring spout, or an extended funneled end 301 or 302. The pouring spout extends outwards from the edges of the sifter 103, funnel the remaining waste within the sifter 103 to a narrowed opening. The pouring spout extends slightly over the end 301 or 302. The pouring spout may have various shapes and designs based on the intended waste which will be poured out of the sifter 103. The pouring spout may be an attachment which is attached to the sifter 103.

In operation, the user pours dirty litter inside the sifter 103 which is placed within the container 102. The unused litter travels through the sifter 103 and the used litter remains in the sifter 103. The user is then able to easily dispose of the used litter and pour the unused litter from the container 102 back into the litter box.

The types of litter that may be cleaned using the present invention include those types that are well known by those of skill in the art. Such litter types include non-clumping and clumping litter which forms clumped aggregates to contain liquid waste. Clay-type, moisture-absorbing types, for example, silica gel litter, may be effectively used with the present invention and methods to collect and remove solid waste.

The variations in the elements of the invention will be readily understood by one of skill in the art to be interchangeable with the elements described herein. These descriptions of the litter sifter element variations in the present invention are intended to be exemplary and are not intended to be limiting in any way.

The invention claimed is:

1. A litter sifter comprising:

a compressible cloth cover configured to receive a frame; and a sifter configured to engage the compressible cloth cover such that a lower portion of the sifter is contained within the compressible cloth cover.

2. The litter sifter of claim 1, wherein the frame comprises an upper frame portion and a lower frame portion.

3. The litter sifter of claim 2, wherein the frame further comprises a plurality of vertical frame members configured to extend between the upper frame portion and the lower frame portion.

4. The litter sifter of claim 3, wherein the plurality of vertical frame members are telescopic.

5. The litter sifter of claim 3, wherein the plurality of vertical frame members are detachably engaged with the upper frame portion.

6. The litter sifter of claim 3, wherein the plurality of vertical frame members are configured to fit within a plurality of vertical channels defined within the compressible cloth cover.

7. The litter sifter of claim 1, wherein the compressible cloth cover forms a container.

8. The litter sifter of claim 1, wherein the compressible cloth cover is coupled to at least part of the frame.

9. The litter sifter of claim 1, wherein the compressible cloth cover has at least one handle.

10. The litter sifter of claim 1, wherein the sifter has substantially flat sides which interface with the compressible cloth cover.

11. The litter sifter of claim 1, wherein the sifter further comprises a spout.

12. The litter sifter of claim 1, wherein the bottom of the sifter is a curved towards a plurality of openings.

13. A litter sifter comprising:

a compressible cloth container; and a sifter configured to engage the compressible cloth container so that a lower portion of the sifter is contained within the compressible cloth container.

14. The litter sifter of claim 13, further comprising:

a frame configured to support the cloth container.

15. The litter sifter of claim 14, wherein the frame comprises a plurality of vertical frame members positioned within the compressible cloth container.

16. The litter sifter of claim 15, wherein the frame further comprises an upper frame member engaged by the compressible cloth cover and configured to support the plurality of vertical frame members.

17. The litter sifter of claim 13, wherein the bottom of the sifter is a curved towards a plurality of openings.

18. A method of cleaning a litter box, comprising:

positioning the sifter of claim 13 within the compressible cloth container; and pouring contents of a litter box into the sifter so that litter clumps remain within the sifter and so that unused litter passes through the sifter into the compressible cloth container.

19. The method of claim 18, further comprising:

removing the sifter from the compressible cloth container; and pouring the litter clumps within the sifter into another receptacle.

20. The method of claim 19, further comprising:

pouring the unused litter from the compressible cloth container back into the litter box.

* * * * *